United States Patent
Meier et al.

[11] Patent Number: 6,014,574
[45] Date of Patent: Jan. 11, 2000

[54] CIRCUIT CONFIGURATION FOR VOLTAGE POLARITY REVERSAL IN A MOBILE RADIO TRANSCEIVER

[75] Inventors: Thomas Meier, München; Klaus-Jürgen Schoepf, Ismaning, both of Germany

[73] Assignee: Siemens Aktiengesellschaft, Munich, Germany

[21] Appl. No.: 08/876,743

[22] Filed: Jun. 16, 1997

[30] Foreign Application Priority Data

Jun. 14, 1996 [DE] Germany ................ 196 23 829

[51] Int. Cl.$^7$ ........................... H04B 1/16
[52] U.S. Cl. .................. 455/572; 455/127; 455/401
[58] Field of Search ..................... 455/572, 127, 455/401, 567, 575; 379/418

[56] References Cited

U.S. PATENT DOCUMENTS

| | | | |
|---|---|---|---|
| 4,159,448 | 6/1979 | Parham | 325/38 A |
| 4,234,762 | 11/1980 | Bosik | 455/401 |
| 4,336,466 | 6/1982 | Sud et al. | 307/297 |
| 5,001,748 | 3/1991 | Burns et al. | 379/418 |
| 5,029,298 | 7/1991 | Chiba et al. | 330/285 |
| 5,050,235 | 9/1991 | Kojima | 455/127 |
| 5,117,450 | 5/1992 | Joglekar et al. | 455/572 |
| 5,327,583 | 7/1994 | Yamada et al. | 455/572 |
| 5,703,827 | 12/1997 | Leung et al. | 365/230.06 |
| 5,771,470 | 6/1998 | Nimmo et al. | 455/572 |

FOREIGN PATENT DOCUMENTS

3405599C2  8/1988  Germany .................. H04M 7/00

OTHER PUBLICATIONS

"Gleichspannungsverdoppler mit 4049", Elektor, Jul./Aug. 1983, p. 40.

"Spannungswandler für Ladegeräte", Helmut Wolken--Möhlmann, RC–Elektronic, 1988, pp. 53–55.

*Primary Examiner*—Reinhard J. Eisenzopf
*Assistant Examiner*—Duc Nguyen
*Attorney, Agent, or Firm*—Herbert L. Lerner; Laurence A. Greenberg

[57] ABSTRACT

A circuit configuration for producing an output voltage having a first polarity with respect to a reference potential, in a mobile radio transceiver supplied with an operating voltage having a second polarity with respect to the reference potential, includes a circuit input terminal for a ringing signal generator supply voltage. A preferred embodiment operates according to a fundamental functional principle of charging a first capacitor to a positive voltage with respect to the fixed reference potential through the use of a voltage overshoot at a coil after the latter has been deenergized. During an on phase of a transistor, the first capacitor charges a second capacitor to a negative voltage with respect to the fixed reference potential. The negative voltage can be picked off externally.

9 Claims, 2 Drawing Sheets

CIRCUIT CONFIGURATION FOR VOLTAGE POLARITY REVERSAL IN A MOBILE RADIO TRANSCEIVER

BACKGROUND OF THE INVENTION

Field of the Invention

The invention relates to a circuit configuration for voltage polarity reversal in a mobile radio transceiver for producing an output voltage having a polarity which is reversed with respect to an operating voltage.

The invention relates, in particular, to a circuit configuration in a mobile radio transceiver (for example mobile telephone) which is supplied with a battery voltage and produces a negative or positive voltage from a voltage which is positive or negative, respectively, with respect to a fixed reference potential.

In mobile radio transceivers which are supplied with a positive battery voltage and generally have one or more MMIC (Monolithic Microwave Integrated Circuit) chips (for example an MMIC power amplifier) on a MESFET basis, a negative gate bias voltage is required, for example, in order to operate the MESFETs. In a known circuit variant with which it is possible to produce a negative voltage in a battery-operated electronic device, an AC voltage having positive and negative voltage amplitudes is produced through the use of an oscillator or multivibrator and is subsequently rectified. In another circuit variant, it is possible to produce a negative voltage by rectification of a received radio-frequency signal applied to the input of an MMIC power amplifier.

However, those two methods have disadvantages. Thus, in the case of the option which was mentioned first, an additional AC voltage signal is produced by the oscillator in the mobile radio transceiver and can impair the operational properties of the device. It is possible, for example, for interference spectra to be modulated onto signals or for neighboring components in the mobile telephone, such as microprocessors, for example, to be influenced and consequently impaired.

In the case of the method which was mentioned second, the fact that the MMIC power amplifier is turned on only after application of the radio-frequency signal and is functional only at relatively high signal levels, turns out to be particularly disadvantageous.

SUMMARY OF THE INVENTION

It is accordingly an object of the invention to provide a circuit configuration for voltage polarity reversal in a mobile radio transceiver, which overcomes the hereinafore-mentioned disadvantages of the heretofore-known devices of this general type and which has low interference.

With the foregoing and other objects in view there is provided, in accordance with the invention, a circuit configuration for producing an output voltage having a first polarity with respect to a fixed reference potential in a mobile radio transceiver supplied with an operating voltage having a second polarity with respect to a reference potential and having a ringing signal generator, comprising a circuit input terminal for a ringing signal generator supply voltage in the form of an AC voltage or pulsed voltage for driving the ringing signal generator in the event of an incoming call.

The circuit configuration according to the invention has particularly little interference since it does not require an additional oscillator, but instead uses the ringing signal generator supply voltage, the so-called clock voltage, which is already present in a mobile telephone. The ringing signal generator supply voltage is an AC voltage or a pulsed voltage with which the ringing signal generator present in a mobile telephone is driven in the event of an incoming call.

Furthermore, the circuit configuration according to the invention has the further particular advantage that it permanently supplies an output voltage having a polarity which is reversed with respect to the operating voltage, because the ringing signal generator supply voltage is permanently present in a mobile radio transceiver.

The circuit configuration according to the invention also has the particular advantage that it can be realized without a large outlay for components and therefore in such a manner that it occupies little space.

In accordance with another feature of the invention, except for the coil and the capacitors, all of the components can be integrated in a simple manner on a single MMIC chip.

No additional oscillator is necessary for the operation of the circuit configuration according to the invention. The operating voltage and the ringing signal generator supply voltage are usually already available in a mobile radio transceiver and do not have to be produced separately for the circuit configuration.

In accordance with a first preferred embodiment of the invention, there is provided a coil coupled between a first terminal of a load path of a transistor, in particular of a source-drain path of a field-effect transistor, and a first circuit input terminal, and a second terminal of the load path of the transistor is electrically conductively connected to a fixed reference potential. During operation of the mobile radio transceiver an operating voltage with a second polarity (for example positive) relative to the reference potential can be applied to the first circuit input terminal. Furthermore, a control terminal of the transistor is coupled through a control line to a second circuit input terminal, to which a ringing signal generator supply voltage can be applied during operation of the mobile radio transceiver. A first capacitor is coupled between the first terminal of the load path of the transistor and a cathode of a first diode, and the cathode of the first diode is coupled to an anode of a second diode. A cathode of the second diode is coupled to the fixed reference potential, while a second capacitor is coupled between the fixed reference potential and an anode of the first diode. The anode of the first diode is connected to a circuit output terminal, at which an output voltage having a first polarity (for example negative) with respect to the fixed reference potential can be picked off.

This embodiment of the circuit configuration according to the invention operates according to the fundamental functional principle that the first capacitor is charged to a positive voltage with respect to the fixed reference potential through the use of a voltage overshoot at the coil after the transistor has been switched off. During an on phase of the transistor, the first capacitor then charges the second capacitor to a negative voltage with respect to the fixed reference potential, which negative voltage can be picked off externally.

The ringing signal generator supply voltage is formed, for example, of voltage pulses of a second polarity with respect to the fixed reference potential, in particular of a rectangular-waveform voltage.

In accordance with an added feature of the invention, a rectangular-waveform voltage is used as the ringing signal generator supply voltage. This advantageously enables very high voltage overshoots to be produced at the coil, as a result of which the efficiency of the circuit configuration can be improved.

In accordance with an additional feature of the invention, a current limiting resistor is connected into the control terminal line (connection between the second circuit input terminal and the control terminal) of the transistor and prevents the ringing signal generator supply voltage from collapsing to a great extent during operation.

In accordance with yet another feature of the invention, there is provided a third capacitor connected into the control line, for DC-decoupling a voltage source which produces the ringing signal generator supply voltage from the circuit configuration.

In accordance with yet a further feature of the invention, there is provided a fourth capacitor coupled between the first circuit input terminal and the fixed reference potential. The effect achieved thereby is that a voltage source which supplies the positive operating voltage is AC-decoupled from the circuit configuration.

In accordance with yet an added feature of the invention, there is provided a feedback resistor connected between the circuit output terminal and the control line of the transistor, through which feedback resistor the control terminal of the transistor is supplied with a negative voltage and the transistor can thereby operate in a particularly current-saving manner.

In accordance with yet an additional feature of the invention, there is provided an additional electrical resistor connected between the second circuit input terminal or the third capacitor and the fixed reference potential. This resistor advantageously effects stabilization of the potential at the control terminal of the transistor with respect to the fixed reference potential.

The transistor being used may advantageously be either a field-effect transistor or a bipolar transistor.

With the objects of the invention in view, there is also provided a circuit configuration for producing an output voltage having a first polarity with respect to the reference potential in a mobile radio transceiver supplied with an operating voltage having a second polarity with respect to the reference potential and having a ringing signal generator, comprising a first capacitor having a first terminal for a ringing signal generator supply voltage in the form of an AC voltage or pulsed voltage for driving the ringing signal generator in the event of an incoming call, and the first capacitor having a second terminal; first and second diodes each having an anode and a cathode; the second terminal of the first capacitor connected to the cathode of the first diode; the cathode of the first diode connected to the anode of the second diode; the cathode of the second diode connected to the reference potential; a second capacitor having a first terminal connected to the anode of the first diode, and a second terminal connected to the reference potential; and a circuit output terminal connected to the first terminal of the second capacitor.

In this simplified second preferred embodiment of a circuit configuration according to the invention, the transistor and the coil as well as the first circuit input terminal with the operating voltage are omitted in comparison with the first preferred embodiment of the circuit configuration specified above. A voltage source which supplies the ringing signal generator supply voltage in this case is connected directly to a first terminal of the first capacitor. During operation, the latter is charged to a voltage having a second polarity with respect to the fixed potential, the value of which voltage corresponds at most to the maximum of the ringing signal generator supply voltage. This simplified embodiment has the particular advantage that it can be produced with an extremely low outlay for components.

The term "mobile radio transceiver" should be broadly interpreted in connection with the present invention. It should be understood as meaning all mobile electronic devices which are suitable for receiving messages through the use of electromagnetic waves.

Other features which are considered as characteristic for the invention are set forth in the appended claims.

Although the invention is illustrated and described herein as embodied in a circuit configuration for voltage polarity reversal in a mobile radio transceiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
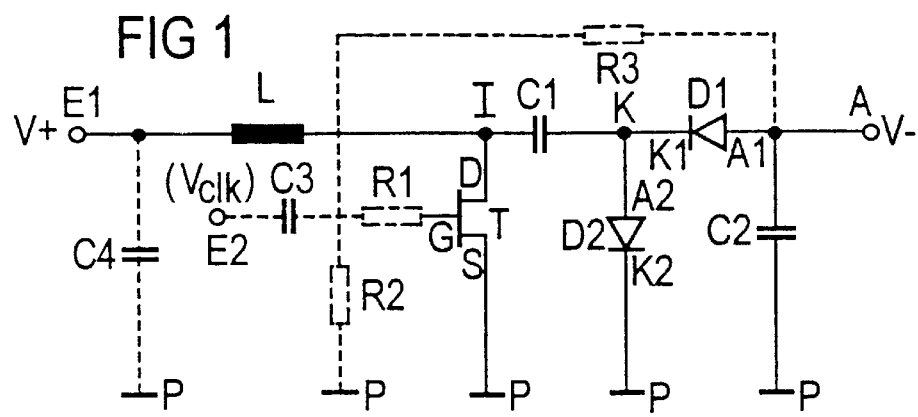
FIG. 1 is a schematic diagram of a first exemplary embodiment of a circuit configuration according to the invention.
Figure 2:
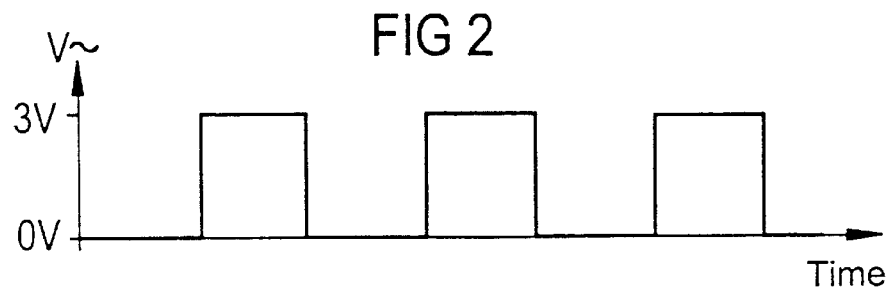
FIG. 2 is an illustration of a voltage-time diagram of a ringing signal generator supply voltage for controlling a transistor.

Referring now to the figures of the drawings in detail and first, particularly, to FIG. 1 thereof, there is seen a circuit configuration having a transistor T which is realized as a field-effect transistor, for example. A coil L (for example having an inductance of 10 $\mu$H) is connected between a drain terminal D (referred to as a first terminal of a load path) of the transistor T and a first circuit input terminal E1, to which a positive operating voltage V+ (for example +3V) is applied. A source terminal S (referred to as a second terminal of the load path) of the transistor T is connected to a fixed reference potential P (for example ground). A gate terminal G (referred to as a control terminal) of the transistor T is connected to a second circuit input terminal E2, to which a ringing signal generator supply voltage $V_{clk}$ (for example a rectangular-waveform voltage having rectangular pulses of +3V as seen in FIG. 2) is applied. A first capacitor C1 (for example having a capacitance of about 1 nF) is connected between the drain terminal D and a cathode K1 of a first diode D1. The cathode K1 of the first diode D1 is also connected to an anode A2 of a second diode D2 and a cathode K2 of the second diode D2 is connected to the fixed reference potential P. A second capacitor C2 (for example having a capacitance of about 1 nF) is connected between the fixed reference potential P and an anode A1 of the first diode D1. The anode A1 of the first diode D1 is connected to a circuit output terminal A, at which a negative voltage V− (approximately −6 to −9V in the case of the inductance and capacitance values specified) can be picked off.

In the circuit configuration of FIG. 1, a gate series resistor R1 (current limiting resistor) with, for example, R =1 kΩ can optionally be connected (as illustrated by a dashed line in FIG. 1) into a gate supply line (a connection between the gate terminal G and the second circuit input terminal E2). If appropriate, this gate series resistor prevents the ringing signal generator supply voltage $V_{clk}$ from collapsing to a great extent.

Furthermore, an additional electrical resistor R2 (for example R=20 kΩ) can be coupled (as illustrated by a dashed line in FIG. 1) between the fixed reference potential P and the second circuit input terminal E2. The resistor R2 effects stabilization of the gate(G)-source(S) potential of the transistor T.

A third capacitor C3 (which is likewise illustrated by a dashed line in FIG. 1) having a capacitance of 1 nF, for example, can be connected between the second circuit input terminal E2 and the gate terminal G or the gate series resistor R1, for the purpose of DC-decoupling of the ringing signal generator supply voltage ($V_{clk}$) supply from the circuit configuration.

Furthermore, a fourth capacitor C4 (once again illustrated by a dashed line in FIG. 1) having a capacitance of 2 nF, for example, can be connected between the first circuit input terminal E1 and the fixed reference potential P, for the purpose of decoupling the coil L from the operating voltage (V+) supply.

In addition, a feedback resistor R3 can be connected (as illustrated by a dashed line in FIG. 1) between the circuit output terminal A and the gate terminal G or the gate series resistor R1, in order to supply the transistor T with a negative gate voltage. This makes it possible to operate the circuit configuration in a particularly current-saving manner.

FIG. 2 illustrates a voltage-time diagram for an exemplary ringing signal generator supply voltage $V_{clk}$, which can be used for driving the transistor T and is available in a mobile radio transceiver (for example a mobile telephone). The time is plotted on the abscissa and a voltage V is plotted on the ordinate. The ringing signal generator supply voltage $V_{clk}$ is a rectangular-waveform voltage having a pulse height of, for example, +3V with respect to the fixed reference potential P (for example earth), having a frequency of, for example, between 5 and 15 MHz and being applied to the second circuit input terminal E2.

Figure 3:
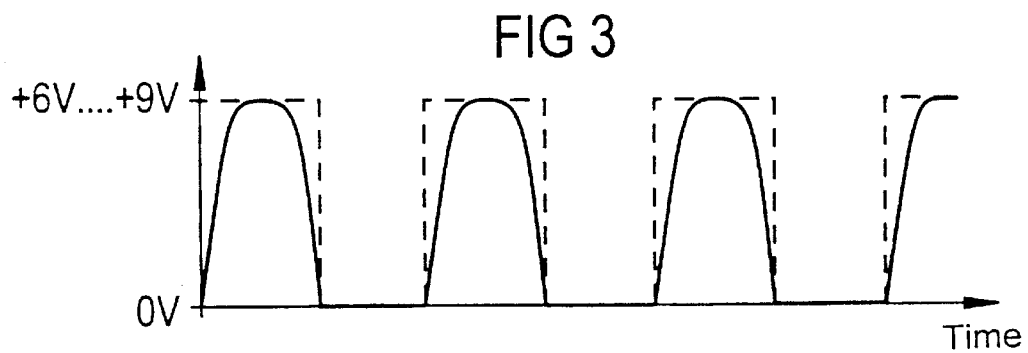
FIG. 3 is an illustration of a voltage-time diagram of a voltage characteristic at a node of the circuit configuration of FIG. 1 which is indicated by reference symbol I in FIG. 1.

The voltage-time diagram illustrated in FIG. 3 diagrammatically illustrates the voltage characteristic at a node of the circuit configuration illustrated in FIG. 1, which is designated by reference symbol I. Analogously to FIG. 2, the time is plotted on the abscissa and a voltage V is plotted on the ordinate. Accordingly, a voltage which is increased with respect to the reference potential P in comparison with the operating voltage V+ and has a maximum of about +6 to +9V is present at the node I within the pulse intervals of the ringing signal generator supply voltage $V_{clk}$. During the pulses, the node I is at the fixed reference potential P due to the switched-on transistor T. The voltage which is increased in comparison with the operating voltage V+ is effected by a voltage overshoot which occurs when the coil L is deenergized and which charges the first capacitor C1. The ideal voltage characteristic is illustrated by dashed lines in FIG. 3.

Figure 4:
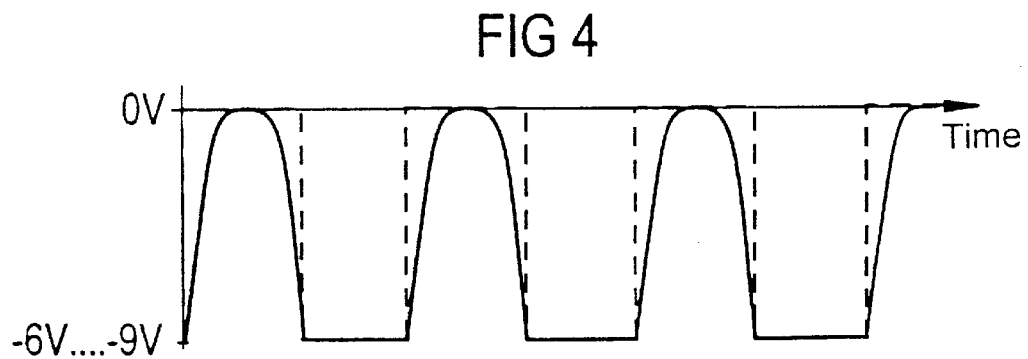
FIG. 4 is an illustration of a voltage-time diagram of a voltage characteristic at a node of the circuit configuration of FIG. 1 which is indicated by reference symbol K in FIG. 1.

The voltage-time diagram illustrated in FIG. 4 diagrammatically illustrates the voltage characteristic at a node which is designated by reference symbol K in FIG. 1. Analogously to FIG. 2 again, the time is plotted on the abscissa and a voltage V is plotted on the ordinate. A voltage having a maximum of about −6 to −9V with respect to the fixed reference potential is present in this case within the pulse intervals of the ringing signal generator supply voltage $V_{clk}$. This voltage having a maximum of about −6 to −9V is produced by virtue of the fact that when the transistor T is switched on and, as a result, the positive pole of the first capacitor C1 is connected to the fixed reference potential, the second capacitor C2 is charged to a negative voltage V− with respect to the fixed reference potential. The ideal voltage characteristic is once again illustrated by dashed lines in FIG. 3.

A pure DC voltage of about −6 to −9V can be picked off at the circuit output terminal A in the unloaded state.

Figure 5:
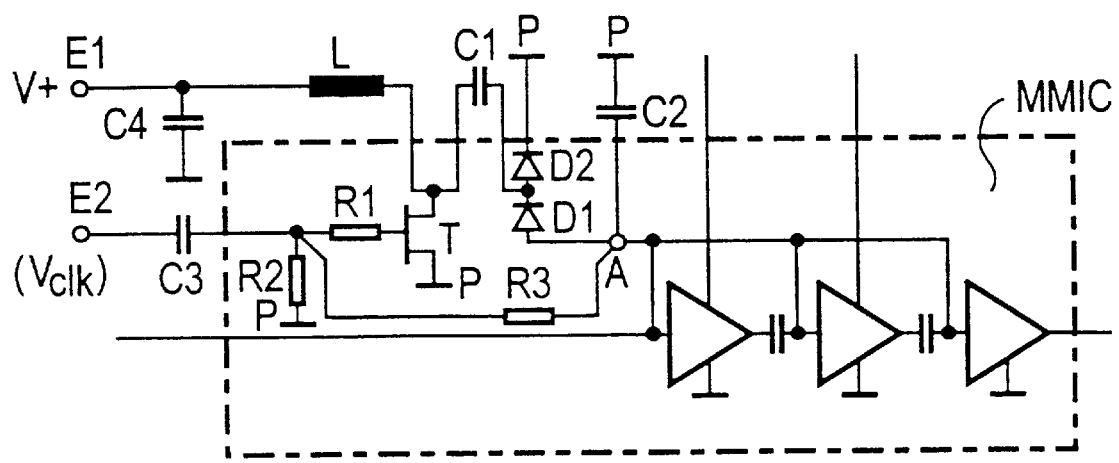
FIG. 5 is a schematic diagram of a circuit configuration according to the invention in connection with an MMIC power amplifier.

In the block diagram of FIG. 5 which illustrates the circuit configuration according to the invention in connection with an MMIC power amplifier chip MMIC having three amplifier stages V1, V2, V3, it can be discerned that the transistor T, the diodes D1 and D2 and, if appropriate, the first, the second and/or the third electrical resistors R1, R2, R3 are integrated on the MMIC power amplifier chip MMIC. The coil L, the first and the second capacitors C1, C2 as well as, if appropriate, the third and the fourth capacitors C3, C4 are disposed outside the MMIC power amplifier chip MMIC.

Figure 6:
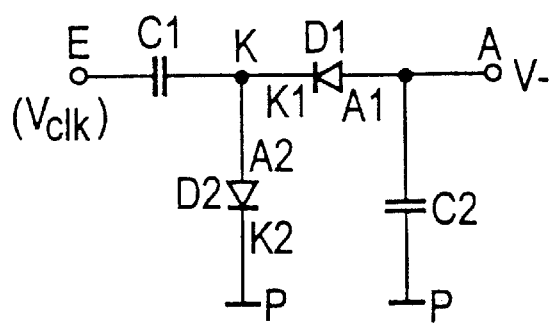
FIG. 6 is a schematic diagram of a second exemplary embodiment of a circuit configuration according to the invention.

The circuit configuration illustrated in FIG. 6 differs from that described above with regard to FIG. 1 by virtue of the fact that the coil L and the transistor T as well as the positive operating voltage V+ are omitted and a first terminal E of the first capacitor C1 is coupled to the ringing signal generator supply voltage $V_{clk}$. The voltage characteristics at the first terminal E of the first capacitor and at the node K connected to a second terminal of the first capacitor C1 correspond, in principle, to the voltage characteristics at the nodes I and K which have been explained above with regard to FIGS. 3 and 4, but with lower voltage values in terms of magnitude. The second capacitor C2 has a first terminal connected to the anode of the first diode D1 and a second terminal connected to the reference potential P.

This circuit configuration of FIG. 6 is particularly suitable for use in a mobile radio transceiver (mobile telephone) if a negative voltage V− having an increased magnitude with respect to the positive operating voltage V+ is not required.

We claim:

1. In a mobile radio transceiver supplied with an operating voltage having a second polarity with respect to a fixed reference potential and having a ringing signal generator, a circuit configuration for producing an output voltage having a first polarity with respect to the fixed reference potential, comprising:

a circuit input terminal for a ringing signal generator supply voltage in the form of an AC voltage or pulsed voltage for driving the ringing signal generator in the event of an incoming call;

a first circuit input terminal for the operating voltage, and a second circuit input terminal for the ringing signal generator supply voltage;

a transistor having a control terminal coupled to said second circuit input terminal, and a load path with first and second load path terminals, the second load path terminal coupled to the fixed reference potential;

a coil coupled between the first load path terminal and said first circuit input terminal;

first and second diodes each having an anode and a cathode, the cathode of said first diode coupled to the anode of said second diode and the cathode of said second diode coupled to the fixed reference potential;

a first capacitor coupled between the first load path terminal and the cathode of said first diode;

second capacitor coupled between the fixed reference potential and the anode of said first diode; and a circuit output terminal for the output voltage being connected to the anode of said first diode.

2. The circuit configuration according to claim 1, including a third capacitor connected between said first circuit input terminal and the fixed reference potential.

3. The circuit configuration according to claim 1, including a current limiting resistor connected upstream of the control terminal of said transistor.

4. The circuit configuration according to claim 3, wherein said transistor, said first and second diodes and said current limiting resistor are integrated on a single MMIC chip.

5. The circuit configuration according to claim 1, including an electrical resistor connected between said second circuit input terminal and the fixed reference potential.

6. The circuit configuration according to claim 1, including a feedback resistor coupled between said circuit output terminal and the control terminal of said transistor.

7. The circuit configuration according to claim 1, wherein said transistor and said first and second diodes are integrated on a single MMIC chip.

8. The circuit configuration according to claim 1, wherein the ringing signal generator supply voltage is a rectangular-waveform voltage formed of voltage pulses having a second polarity with respect to the reference potential.

9. The circuit configuration according to claim 1, wherein said first and second diodes are integrated on a single MMIC chip.

* * * * *